US008191706B1

(12) United States Patent  (10) Patent No.: US 8,191,706 B1
Liu  (45) Date of Patent: Jun. 5, 2012

(54) PROTECTIVE CASING ADAPTED FOR DIFFERENT ELECTRONIC DEVICES

(75) Inventor: Wen-Chin Liu, New Taipei (TW)

(73) Assignee: MITAC International Corp., Kuei-Shan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 13/074,023

(22) Filed: Mar. 29, 2011

(51) Int. Cl.
*B65D 85/00* (2006.01)
(52) U.S. Cl. .................................... 206/320; 361/679.56
(58) Field of Classification Search .................. 206/320, 206/305, 701, 722, 724; 361/679.3, 679.56
See application file for complete search history.

(56) References Cited

U.S. PATENT DOCUMENTS

| | | | | |
|---|---|---|---|---|
| 7,663,879 B2* | 2/2010 | Richardson et al. | ..... | 361/679.56 |
| 7,933,122 B2* | 4/2011 | Richardson et al. | ..... | 361/679.55 |
| 2006/0021889 A1* | 2/2006 | Kim | .............. | 206/320 |
| 2008/0053851 A1* | 3/2008 | Ko et al. | ......... | 206/320 |
| 2008/0053852 A1* | 3/2008 | Ko et al. | ......... | 206/320 |
| 2008/0083631 A1* | 4/2008 | Tsang et al. | ......... | 206/320 |
| 2009/0114556 A1* | 5/2009 | Tai et al. | ......... | 206/320 |
| 2010/0224519 A1* | 9/2010 | Kao | .............. | 206/320 |
| 2011/0073505 A1* | 3/2011 | Stiehl | ............. | 206/320 |

* cited by examiner

*Primary Examiner* — Jacob K Ackun
(74) *Attorney, Agent, or Firm* — Winston Hsu; Scott Margo (57) ABSTRACT

A protective casing is adapted for a first electronic device with a first button and a second electronic device with a second button. The protective casing includes a lower casing and an upper casing. The lower casing includes a partition member disposed therein. The partition member has a first resilient arm extended from a periphery of the partition member. The upper casing cooperates with the lower casing to form a first accommodating space, wherein the first accommodating space is above the partition member. When the first electronic device is accommodated in the first accommodating space, the first button is at a first distance from a bottom of the partition member. When the second electronic device is accommodated in the first accommodating space, the second button is at a second distance from the bottom of the partition member. A length of the first resilient arm covers the first and second distances.

15 Claims, 14 Drawing Sheets

PROTECTIVE CASING ADAPTED FOR DIFFERENT ELECTRONIC DEVICES

BACKGROUND OF THE INVENTION

1. Field of the Invention

The invention relates to a protective casing and, more particularly, to a protective casing adapted for different electronic devices.

2. Description of the Prior Art

As technology advances, various electronic devices including mobile phone, media player (e.g. MP3 player), personal digital assistant (PDA) and so on have been developed to make life more convenient and colorful. In order to protect the electronic device from harm, a user may use a protective casing to accommodate the electronic device. In the prior art, there are various protective casings adapted for various electronic devices respectively; that is, each kind of protective casing can only be used to accommodate one specific electronic device. For example, a protective casing may have a key structure used to trigger a corresponding button on an electronic device when the electronic device is accommodated in the protective casing. However, if a user wants to use the protective casing to accommodate another electronic device, the key structure of the protective casing is unable to be used to trigger another button due to its original structure design. Therefore, if the user has more than one electronic device, he or she has to buy more than one protective casing for each electronic device correspondingly. As a result, it is inevitable to increase additional cost.

SUMMARY OF THE INVENTION

An objective of the invention is to provide a protective casing adapted for different electronic devices, so as to solve the aforesaid problem.

According to one embodiment of the invention, a protective casing is adapted for a first electronic device with a first button and a second electronic device with a second button. The protective casing comprises a lower casing and an upper casing. The lowercasing comprises a partition member disposed therein. The partition member has a first resilient arm extended from a periphery of the partition member. The upper casing cooperates with the lower casing to form a first accommodating space therebetween, wherein the first accommodating space is above the partition member. When the first electronic device is accommodated in the first accommodating space, the first button is at a first distance from a bottom of the partition member. When the second electronic device is accommodated in the first accommodating space, the second button is at a second distance from the bottom of the partition member. A length of the first resilient arm covers the first and second distances. In this embodiment, the lower casing has a key structure corresponding to the first resilient arm of the partition member.

As mentioned in the above, no matter which one of the first and second electronic devices is accommodated in the protective casing, a user can press the key structure to drive the first resilient arm to trigger the first or second button. Since the protective casing of the invention can be used to accommodate different electronic devices, the protective casing of the invention will save cost for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
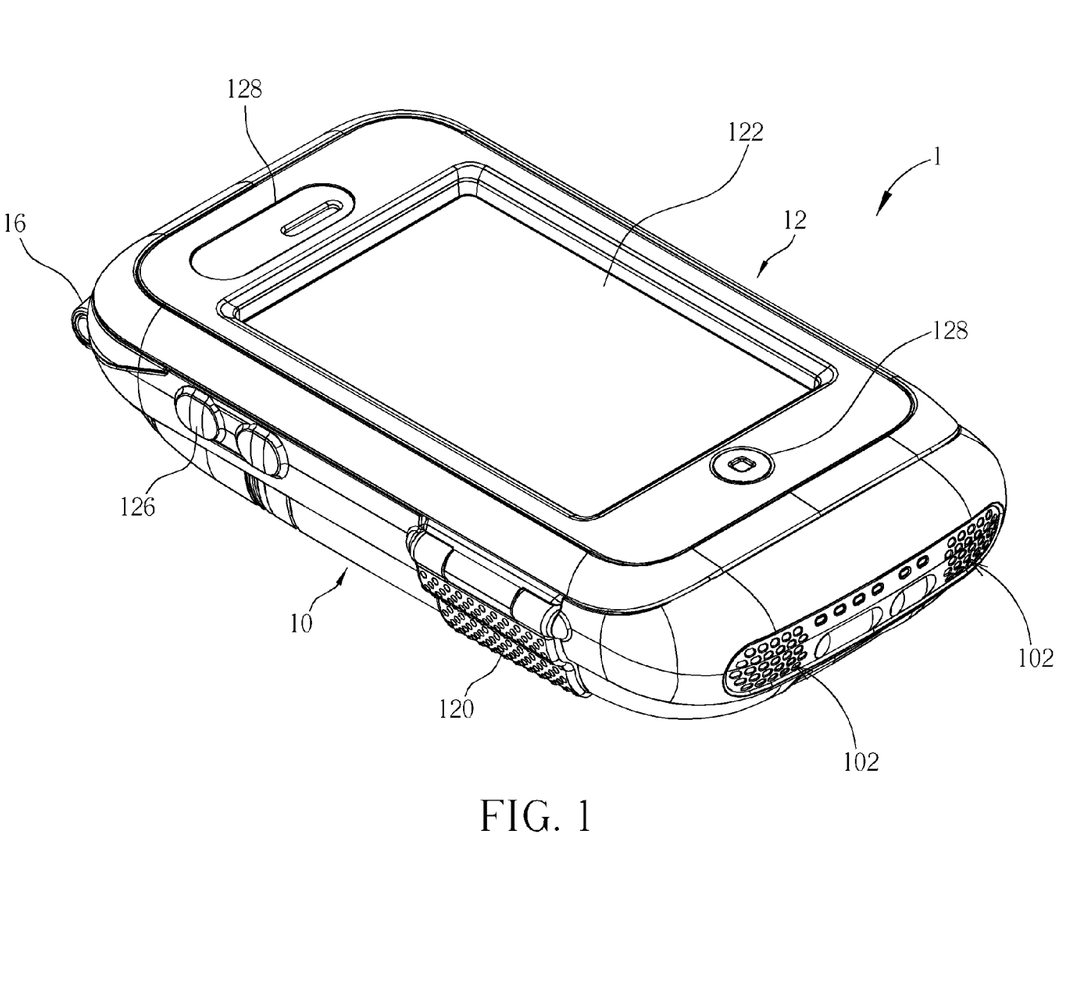
FIG. 1 is a perspective view illustrating a protective casing in a closed state according to one embodiment of the invention.
Figure 2:
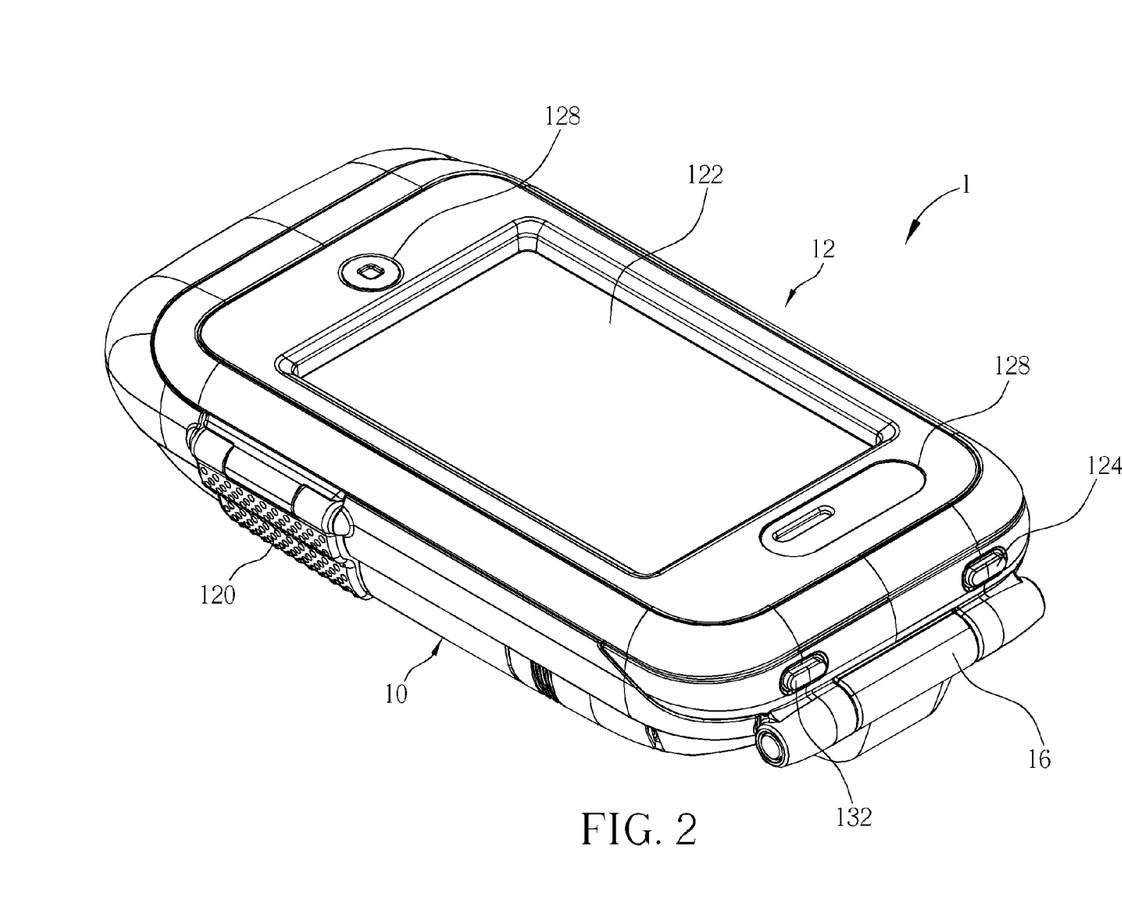
FIG. 2 is a perspective view illustrating the protective casing in FIG. 1 from another view angle.
Figure 3:
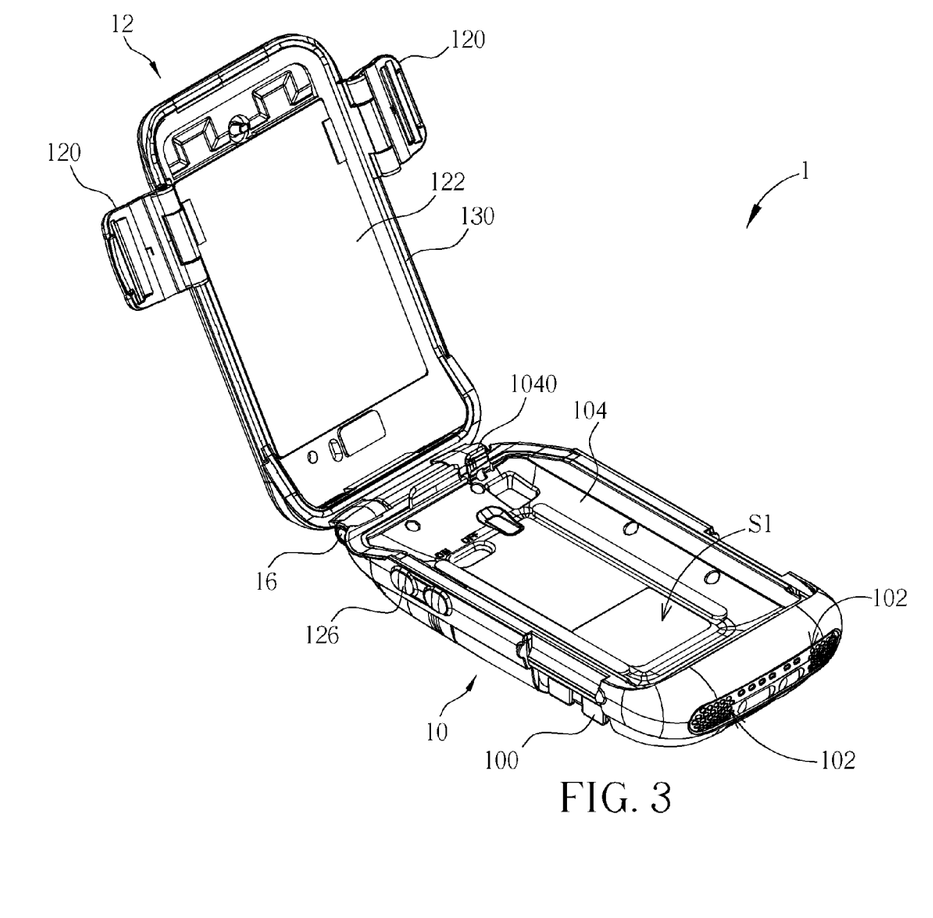
FIG. 3 is a perspective view illustrating the protective casing in FIG. 1 in an opened state.
Figure 4:
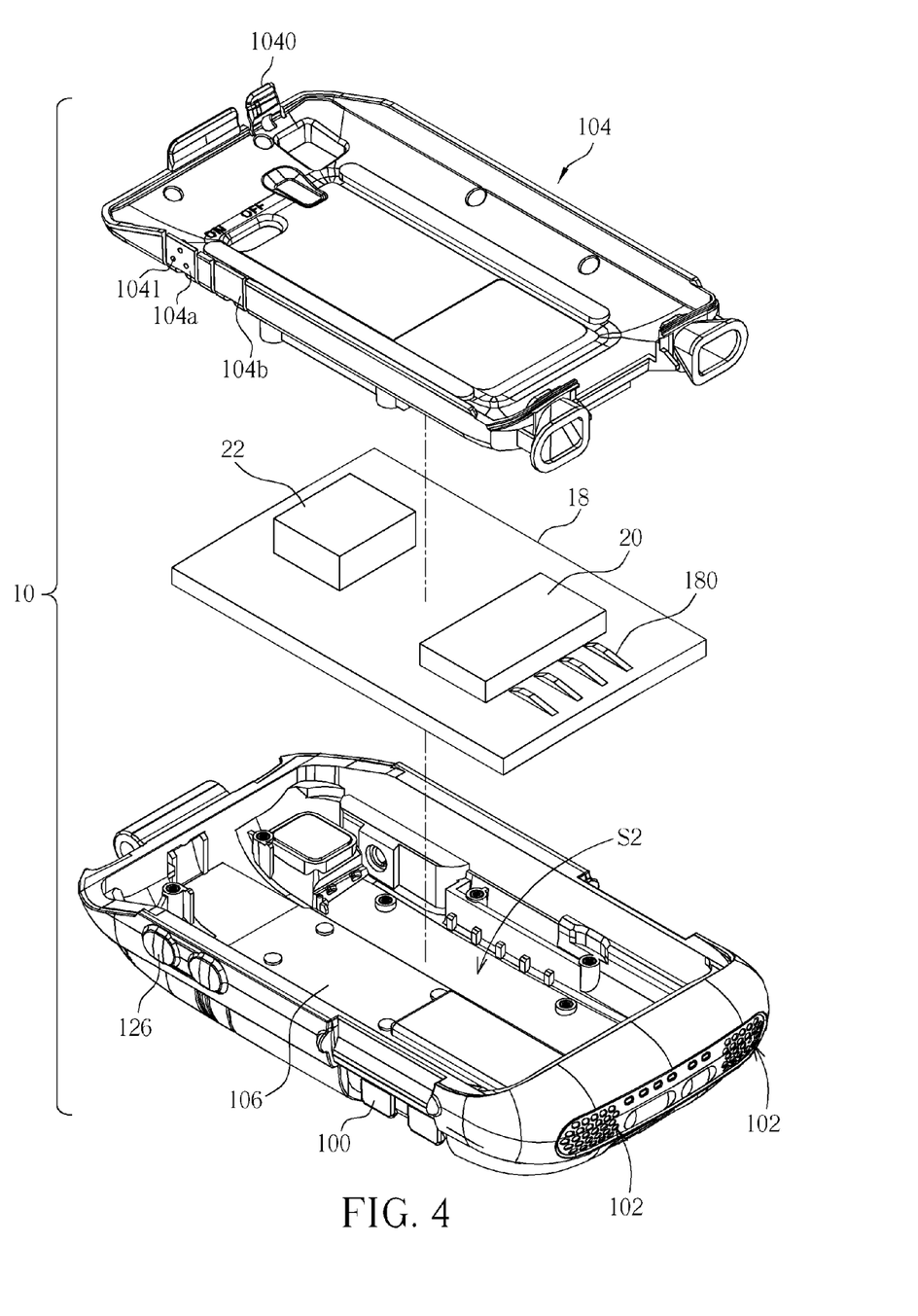
FIG. 4 is an exploded view illustrating the lower casing in FIG. 3.
Figure 5:
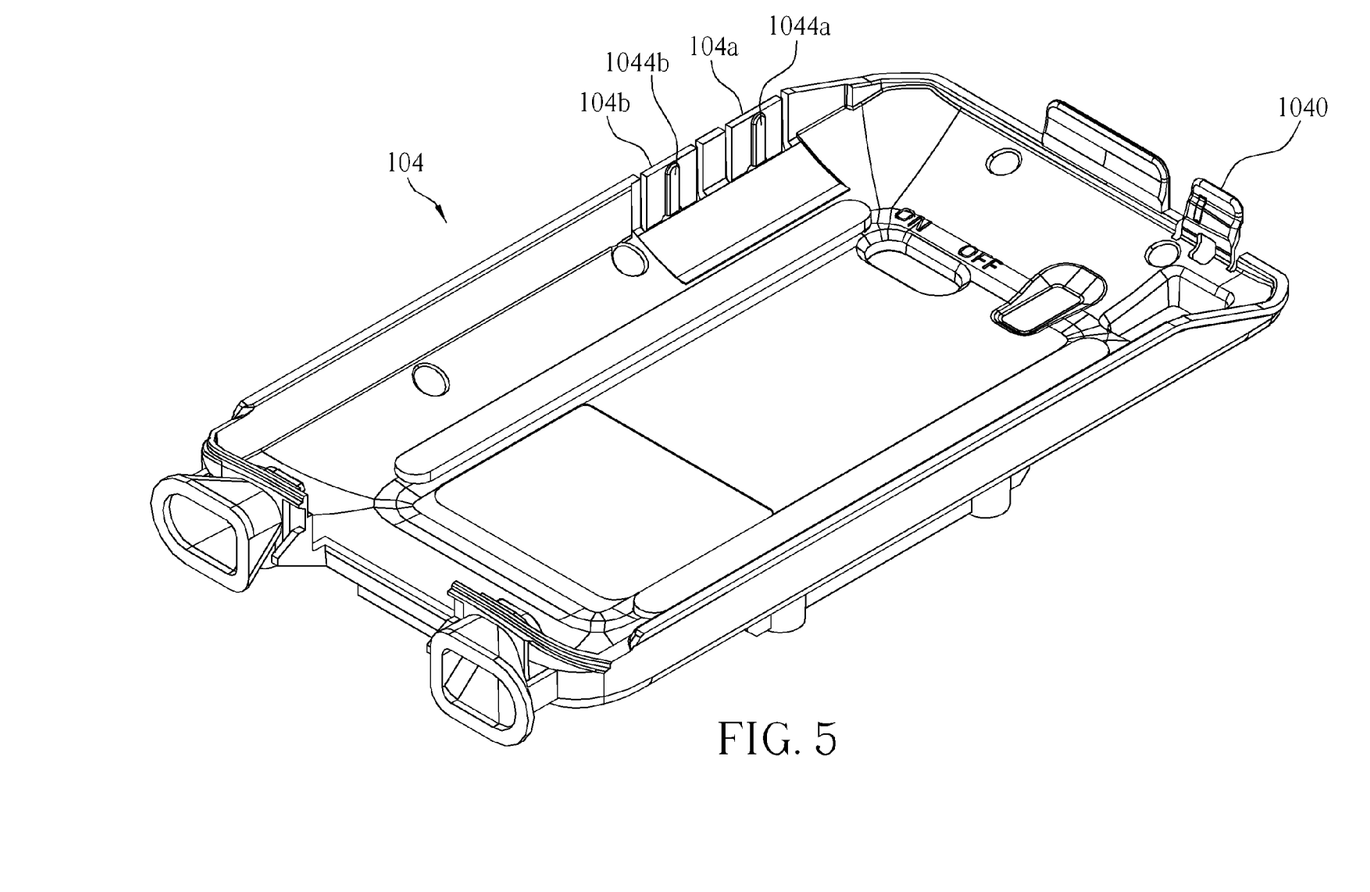
FIG. 5 is a perspective view illustrating the partition member in FIG. 4 from another view angle.

Referring to FIGS. 1 to 5, FIG. 1 is a perspective view illustrating a protective casing 1 in a closed state according to one embodiment of the invention, FIG. 2 is a perspective view illustrating the protective casing 1 in FIG. 1 from another view angle, FIG. 3 is a perspective view illustrating the protective casing 1 in FIG. 1 in an opened state, FIG. 4 is an exploded view illustrating the lower casing 10 in FIG. 3, and FIG. 5 is a perspective view illustrating the partition member 104 in FIG. 4 from another view angle.

As shown in FIGS. 1 to 5, the protective casing 1 comprises a lower casing 10 and an upper casing 12, and the lower casing 10 comprises a partition member 104 disposed therein. The partition member 104 at least has a first resilient arm 104a extended from a periphery of the partition member 104. In the embodiment, the partition member 104 is exemplified by including the first resilient arm 104a and a second resilient arm 104b extended from the periphery of the partition member 104. The second resilient arm 104b is adjacent to the first resilient arm 104a. The upper casing 12 cooperates with the lowercasing 10 to form a first accommodating space S1 therebetween. The first accommodating space S1 is above the partition member 104. In this embodiment, a plurality of protrusions 1041 may be formed on an outer surface of the first resilient arm 104a. The protrusions 1041 can be used to fix a flexible print circuit (not shown) or for specific purpose.

In this embodiment, the protective casing 1 may further comprise a hinge assembly 16 for pivotally connecting the upper casing 12 to the lower casing 10. Furthermore, the upper casing 12 may comprise two fastener members 120 pivotally connected to opposite sides of the upper casing 12, the lower casing 10 may comprise two fastener structures 100 formed on opposite sides of the lower casing 10, and the two fastener members 120 can be detachably fastened on the two fastener structures 100 respectively. It should be noted that there is only one fastener structure 100 shown in FIG. 3 due to the view angle. When the two fastener members 120 are fastened on the two fastener structures 100 respectively, the protective casing 1 is fixed in the closed state shown in FIGS. 1 and 2. After the two fastener members 120 are detached from the two fastener structures 100 respectively and the upper casing 12 rotates with respect to the lower casing 10 via the hinge assembly 16, the protective casing 1 is in the opened state shown in FIG. 3. Accordingly, a user can operate the protective casing 1 between the closed state and the opened state.

Figure 6:
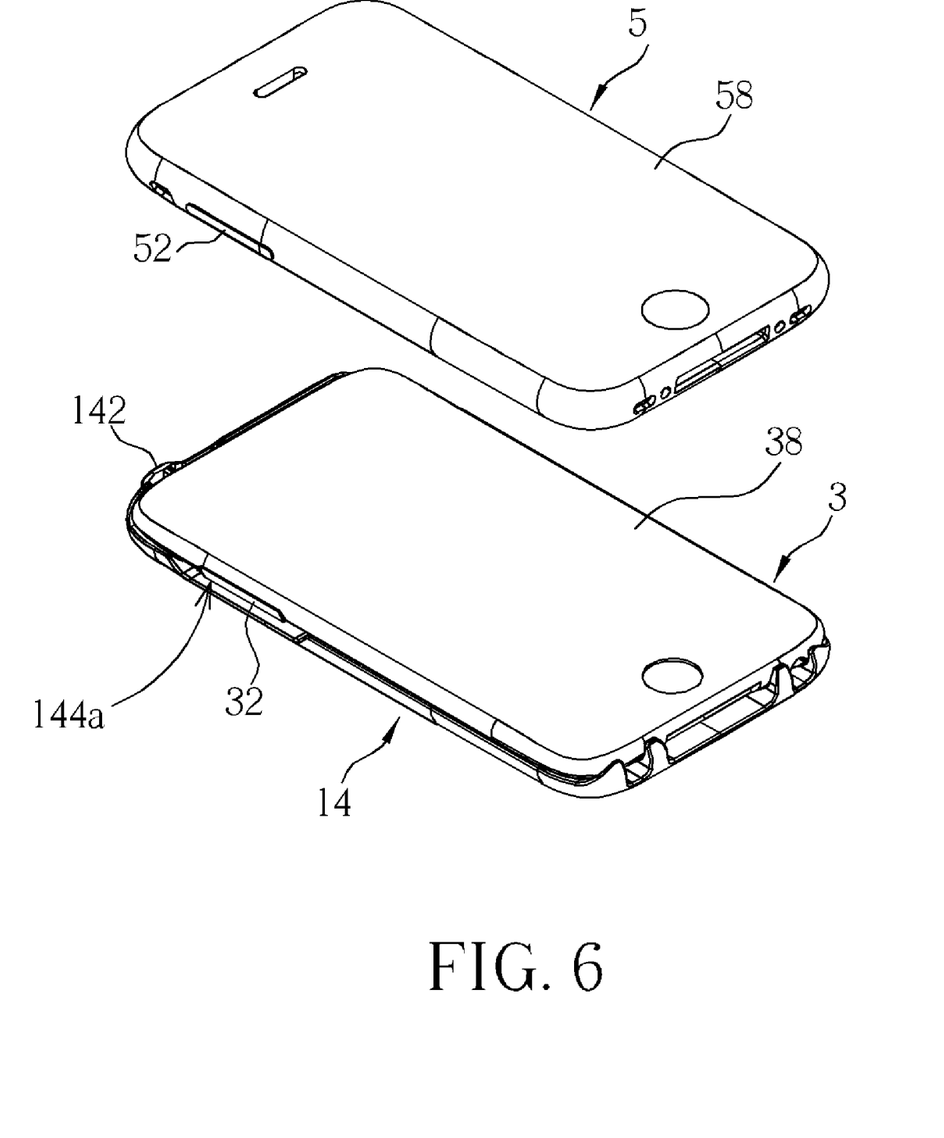
FIG. 6 is a perspective view illustrating a first electronic device housed on a back cover and a second electronic device.
Figure 7:
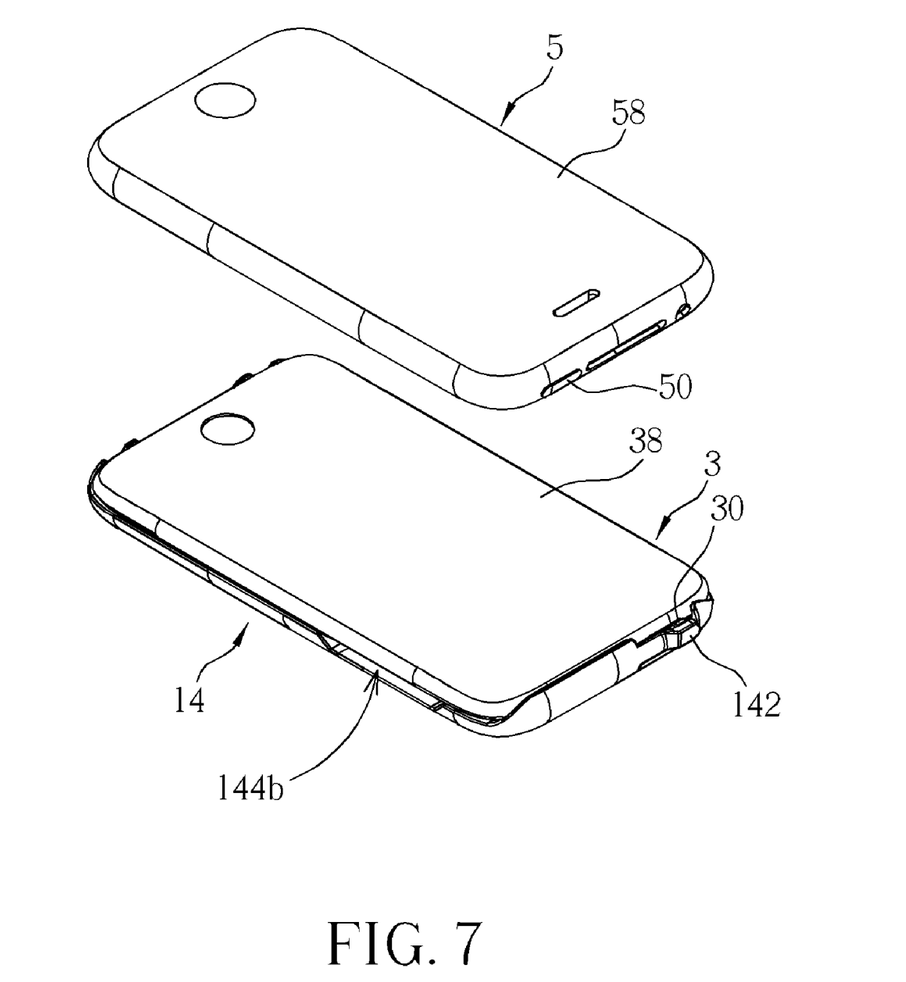
FIG. 7 is a perspective view illustrating the first electronic device housed on the back cover and the second electronic device in FIG. 6 from another view angle.
Figure 8:
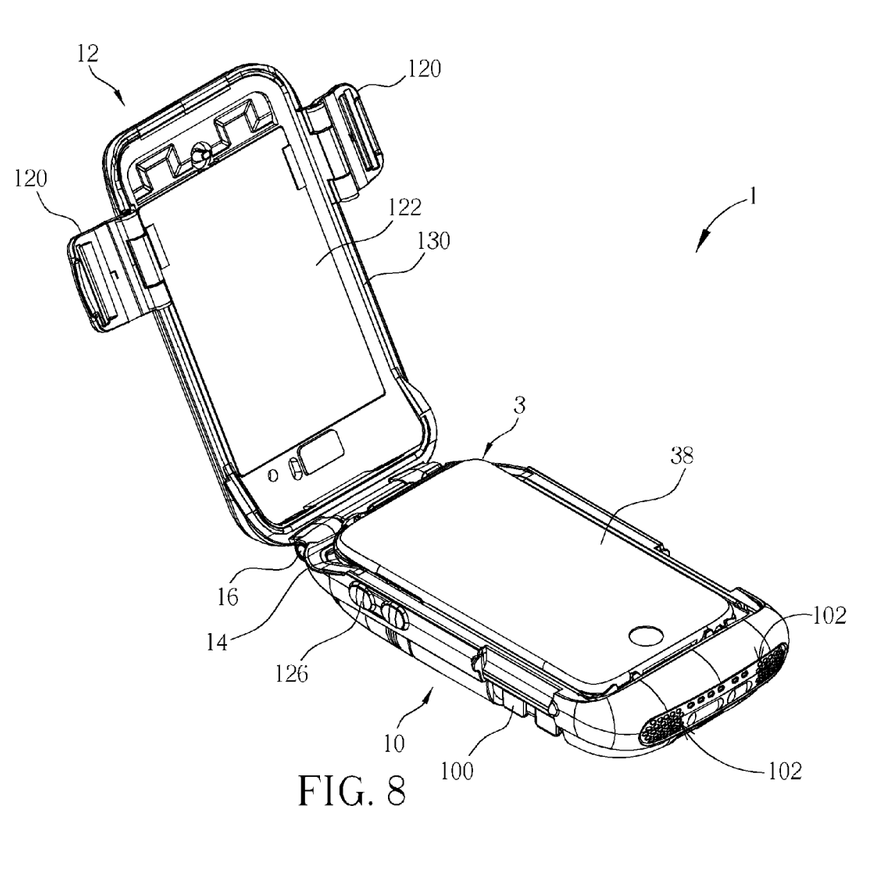
FIG. 8 is a perspective view illustrating the electronic device accommodated in the first accommodating space together with the back cover.
Figure 9:
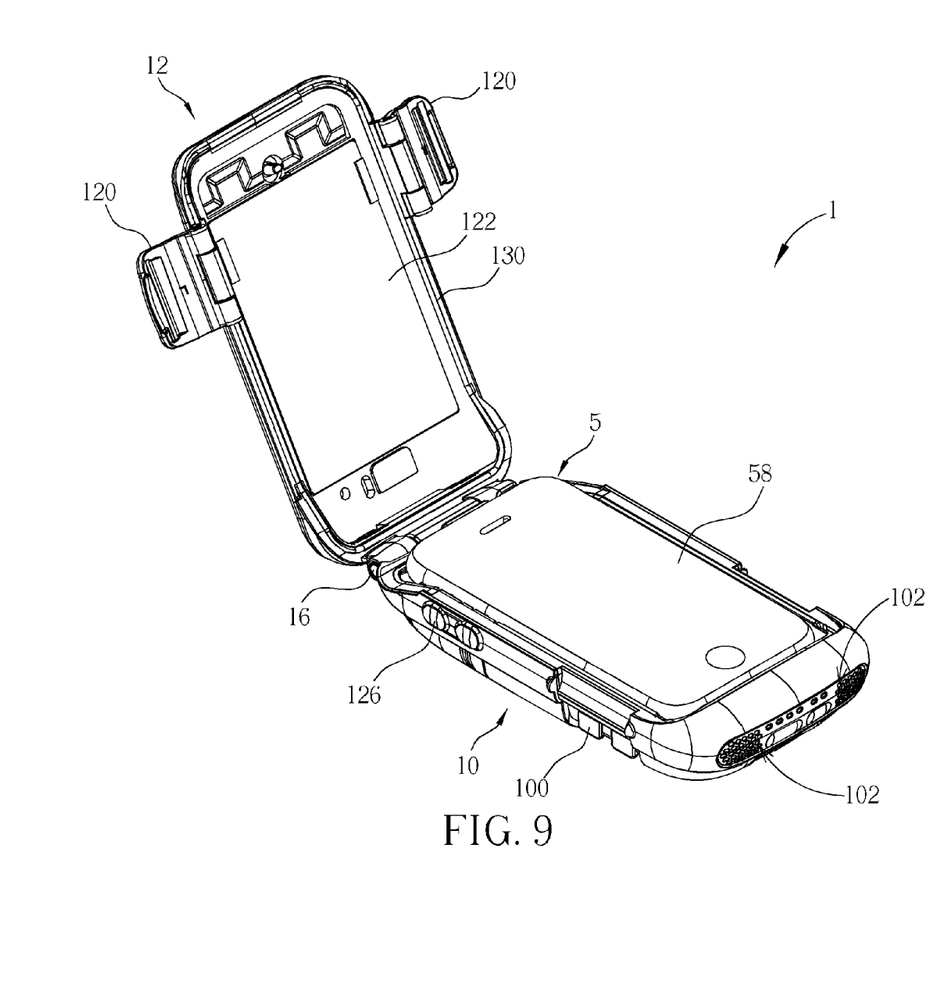
FIG. 9 is a perspective view illustrating the electronic device accommodated in the first accommodating space.

Referring to FIGS. 6 to 9, FIG. 6 is a perspective view illustrating a first electronic device 3 housed on a back cover 14 and a second electronic device 5, FIG. 7 is a perspective view illustrating the first electronic device 3 housed on the back cover 14 and the second electronic device 5 in FIG. 6 from another view angle, FIG. 8 is a perspective view illustrating the electronic device 3 accommodated in the first accommodating space S1 together with the back cover 14, and FIG. 9 is a perspective view illustrating the electronic device 5 accommodated in the first accommodating space S1.

In this embodiment, the protective casing may further comprise a back cover 14 for housing the first electronic device 3. The back cover 14 can be detachably accommodated in the first accommodating space S1. As shown in FIGS. 6 and 8, after housing the first electronic device 3 on the back cover 14, the first electronic device 3 can be accommodated in the first accommodating space S1 together with the back cover 14. Furthermore, as shown in FIGS. 6 and 7, the size of the second electronic device 5 is substantially equal to the total size of the first electronic device 3 with the back cover 14. Therefore, the second electronic device 5 can be accommodated in the first accommodating space S1 of the protective casing 1 immediately, as shown in FIG. 9. That is to say, the protective casing 1 of the invention can be adapted for different electronic devices 3 and 5 with or without the back cover 14. If the user has the two electronic devices 3 and 5 at the same time, he or she can use the very same protective casing 1 to accommodate the second electronic device 5 or the first electronic device 3 with the back cover 14. The first or second electronic device 3, 5 may be a mobile phone, media player (e.g. MP3 player), personal digital assistant (PDA) and so on.

As shown in FIG. 4, a second accommodating space S2 is between the partition member 104 and a bottom 106 of the lower casing 10. In this embodiment, the protective casing 1 may further comprise a circuit board 18 and a power supply unit 20 disposed in the second accommodating space S2. The power supply unit 20 is electrically connected to the circuit board 18. When the first electronic device 3 is housed on the back cover 14 and accommodated in the first accommodating space S1 together with the back cover 14, a connector (not shown) of the first electronic device 3 is electrically connected to a connector 180 of the circuit board 18, such that the power supply unit 20 can supply power to the first electronic device 3. Similarly, when the second electronic device 5 is accommodated in the first accommodating space S1, a connector (not shown) of the second electronic device 5 is electrically connected to the connector 180 of the circuit board 18, such that the power supply unit 20 can supply power to the second electronic device 5. In this manner, the operating time of the first or second electronic device 3, 5 can be effectively extended. In practical applications, the power supply unit 20 may be, but not limited to, a battery.

As shown in FIG. 4, the protective casing 1 may further comprise a positioning unit 22 disposed in the second accommodating space S2 and electrically connected to the circuit board 18. In practical applications, the positioning unit 22 may be, but not limited to, a Global Positioning System (GPS). The positioning unit 22 can be used to assist the first or second electronic device 3, 5 in positioning itself once the first or second electronic device 3, 5 cannot position itself precisely.

In this embodiment, the upper casing 12 may comprise a transparent sheet 122 (e.g. PET film). When the first electronic device 3 is accommodated in the first accommodating space S1 together with the back cover 14 and when the protective casing 1 is in the closed state (as shown in FIG. 1), a touch panel 38 of the first electronic device 3 abuts against the transparent sheet 122. Similarly, when the second electronic device 5 is accommodated in the first accommodating space S1 and when the protective casing 1 is in the closed state (as shown in FIG. 1), a touch panel 58 of the second electronic device 5 abuts against the transparent sheet 122. Accordingly, the user may perform tactile operation to the touch panel 38 or 58 via the transparent sheet 122.

As shown in FIG. 6, the first electronic device 3 has a first button 32 (e.g. volume adjusting button) disposed on one side of the first electronic device 3, so a recess 144a may be formed on one side of the back cover 14 and corresponding to the first button 32. When the first electronic device 3 is housed on the back cover 14, the first button 32 is exposed from the recess 144a. Accordingly, the user can operate the first button 32 via the recess 144a. Furthermore, a recess 144b may be formed on another side of the back cover 14 and opposite to the recess 144a, as shown in FIG. 7. Accordingly, the user can grab opposite sides of the first electronic device 3 via the recesses 144a, 144b and then detaches the first electronic device 3 from the back cover 14 easily. Still further, the second electronic device 5 has a second button 52 (e.g. volume adjusting button) disposed on one side of the second electronic device 5, as shown in FIG. 6.

Figure 10:
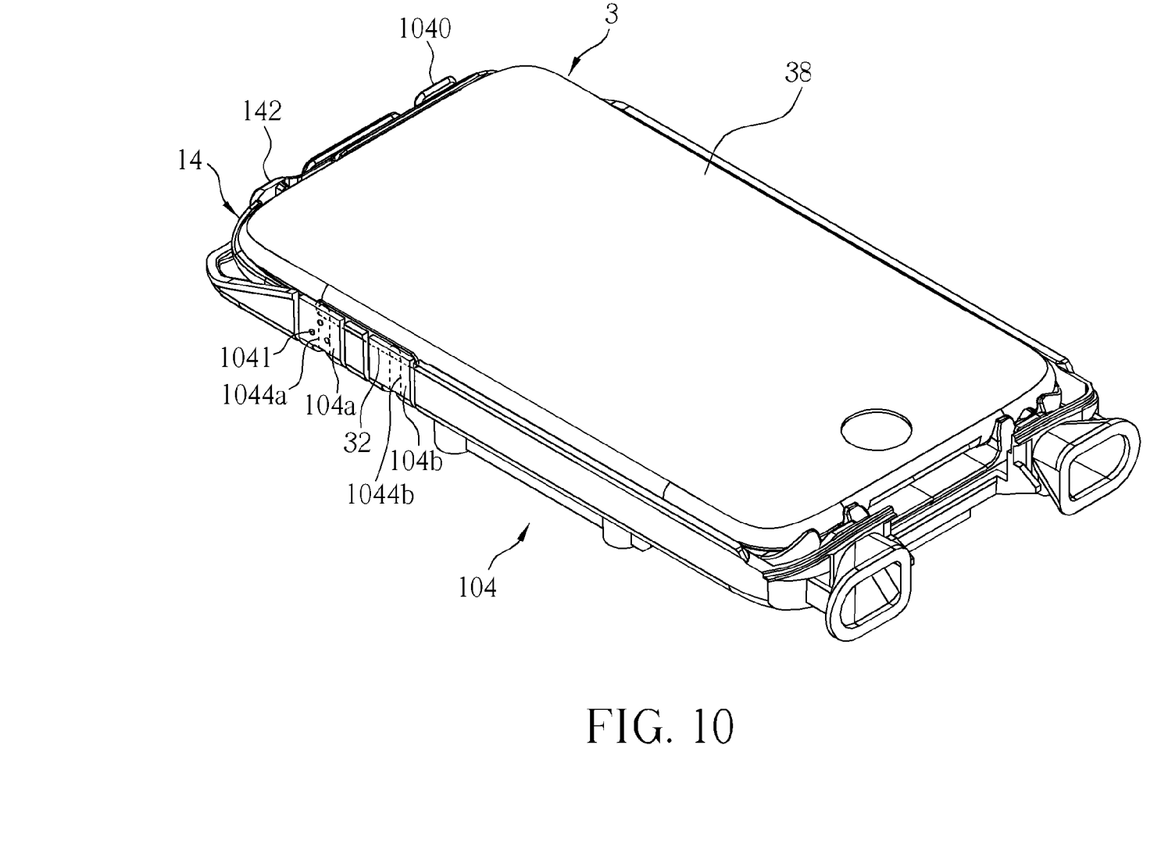
FIG. 10 is a perspective view illustrating the first electronic device together with the back cover in FIG. 6 disposed on the partition member in FIG. 4.
Figure 11:
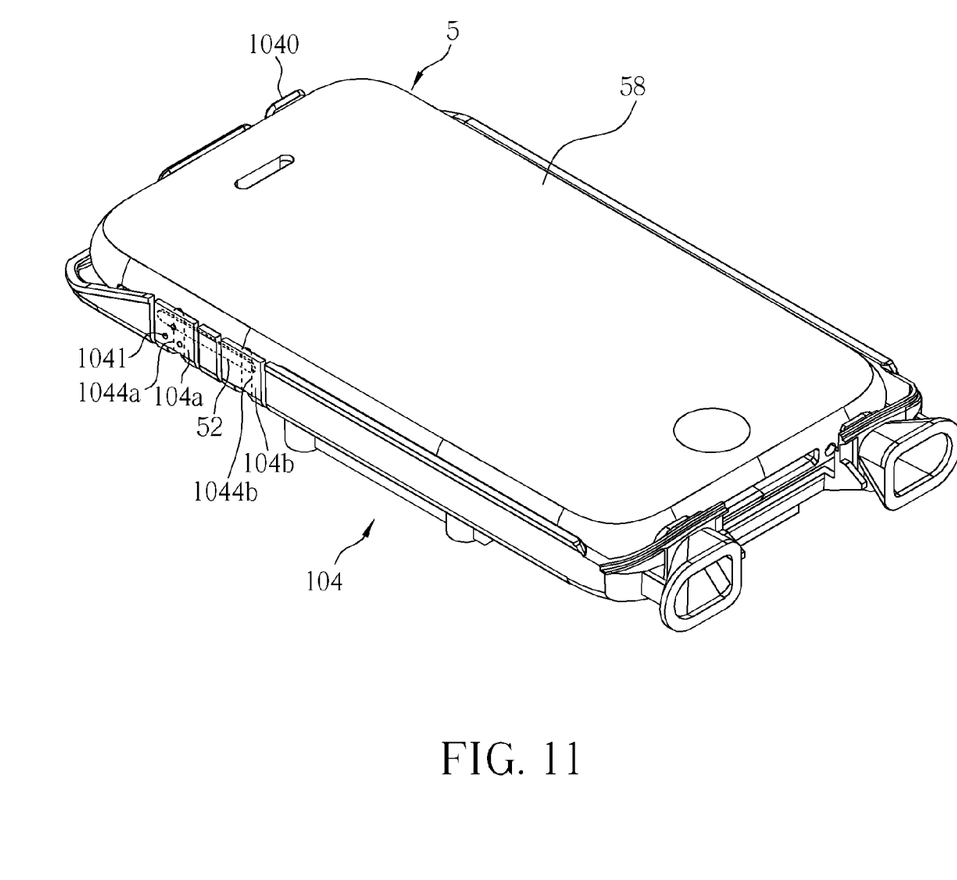
FIG. 11 is a perspective view illustrating the second electronic device in FIG. 6 disposed on the partition member in FIG. 4.
Figure 12:
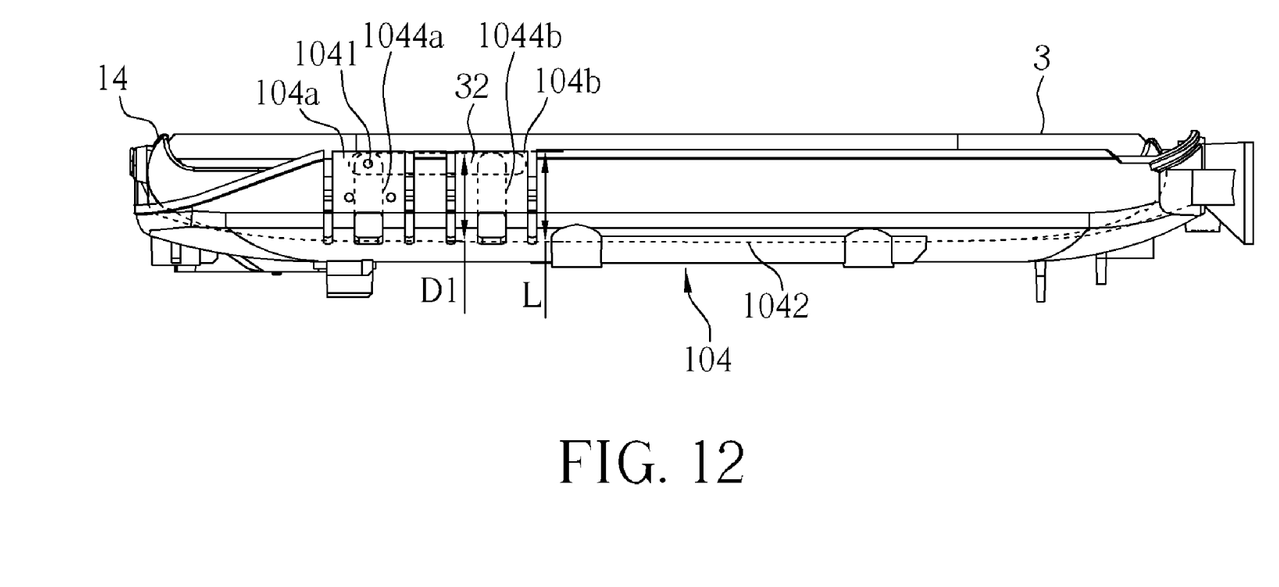
FIG. 12 is a side view illustrating the first electronic device together with the back cover disposed on the partition member in FIG. 10.
Figure 13:
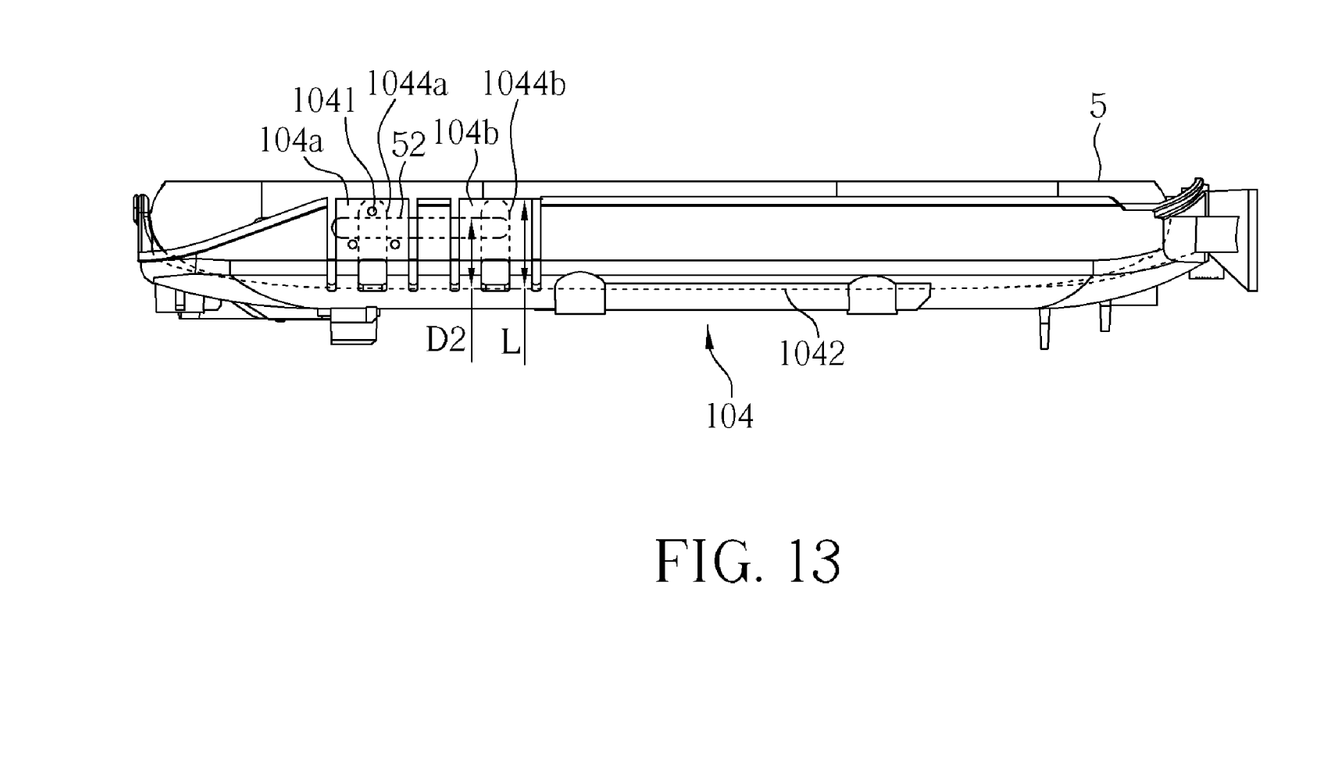
FIG. 13 is a side view illustrating the second electronic device disposed on the partition member in FIG. 11.

Referring to FIGS. 10 to 13, FIG. 10 is a perspective view illustrating the first electronic device 3 together with the back cover 14 in FIG. 6 disposed on the partition member 104 in FIG. 4, FIG. 11 is a perspective view illustrating the second electronic device 5 in FIG. 6 disposed on the partition member 104 in FIG. 4, FIG. 12 is a side view illustrating the first electronic device 3 together with the back cover 14 disposed on the partition member 104 in FIG. 10, and FIG. 13 is a side view illustrating the second electronic device 5 disposed on the partition member 104 in FIG. 11.

As shown in FIG. 5, the first resilient arm 104a may comprise a linear rib 1044a formed on an inner surface of the first resilient arm 104a, and the second resilient arm 104b may comprise a linear rib 1044b formed on an inner surface of the second resilient arm 104b. As shown in FIGS. 10 and 12, when the first electronic device 3 together with the back cover 14 is accommodated in the first accommodating space S1 above the partition member 104, the linear ribs 1044a and 1044b faces the first electronic device 3 and the first button 32 is at a first distance D1 from a bottom 1042 of the partition member 104. As shown in FIGS. 11 and 13, when the second electronic device 5 is accommodated in the first accommodating space S1 above the partition member 104, the linear ribs 1044a and 1044b faces the second electronic device 5 and the second button 52 is at a second distance D2 from the bottom 1042 of the partition member 104.

Still further, the first button 32 is in contact with the linear ribs 1044a and 1044b of the first and second resilient arms 104a and 104b at a first position (as shown in FIG. 12), the second button 52 is in contact with the linear ribs 1044a and 1044b of the first and second resilient arms 104a and 104b at a second position (as shown in FIG. 13), and the first position is different from the second position. Accordingly, the linear ribs 1044a and 1044b can be used for pressing the first or second button 32, 52 when the first or second electronic device 3, 5 is accommodated in the protective casing 1.

In this embodiment, a length L of the first and second resilient arms 104a, 104b can cover the first and second distances D1, D2, as shown in FIGS. 12 and 13. In other words, the length L of the first and second resilient arms 104a, 104b is long enough to cover different buttons disposed on different electronic devices. Furthermore, the lower casing 10 may have a key structure 126 (as shown in FIG. 1) corresponding to the first and second resilient arms 104a, 104b of the partition member 104 (as shown in FIGS. 10 to 13).

In this manner, when the first electronic device 3 is accommodated in the protective casing 1 together with the back cover 14, the user can press the key structure 126 to drive the first or second resilient arm 104a, 104b with the linear ribs 1044a, 1044b to trigger the first button 32, so as to operate the first button 32. Similarly, when the second electronic device 5 is accommodated in the protective casing 1, the user can press the key structure 126 to drive the first or second resilient arm 104a, 104b with the linear ribs 1044a, 1044b to trigger the second button 52, so as to operate the second button 52. Therefore, no matter which one of the first and second electronic devices 3, 5 is accommodated in the protective casing 1, the user can press the key structure 126 to drive the first and second resilient arms 104a, 104b with the linear ribs 1044a, 1044b to trigger the first or second button 32, 52 at different height.

As shown in FIG. 7, the first electronic device 3 may have a power button 30, and the back cover 14 may have a resilient arm 142 extending from the periphery of the back cover 14 and corresponding to the power button 30 of the first electronic device 3. When the first electronic device 3 is housed on the back cover 14, the resilient arm 142 abuts against the power button 30. Furthermore, the upper casing 12 may have a key structure 124 (as shown in FIG. 2) corresponding to the resilient arm 142 of the back cover 14 (as shown in FIGS. 6 and 7). In this manner, when the first electronic device 3 is accommodated in the protective casing 1 together with the back cover 14, the user can press the key structure 124 to drive the resilient arm 142 to trigger the power button 30, so as to power on/off the electronic device 3.

Figure 14:
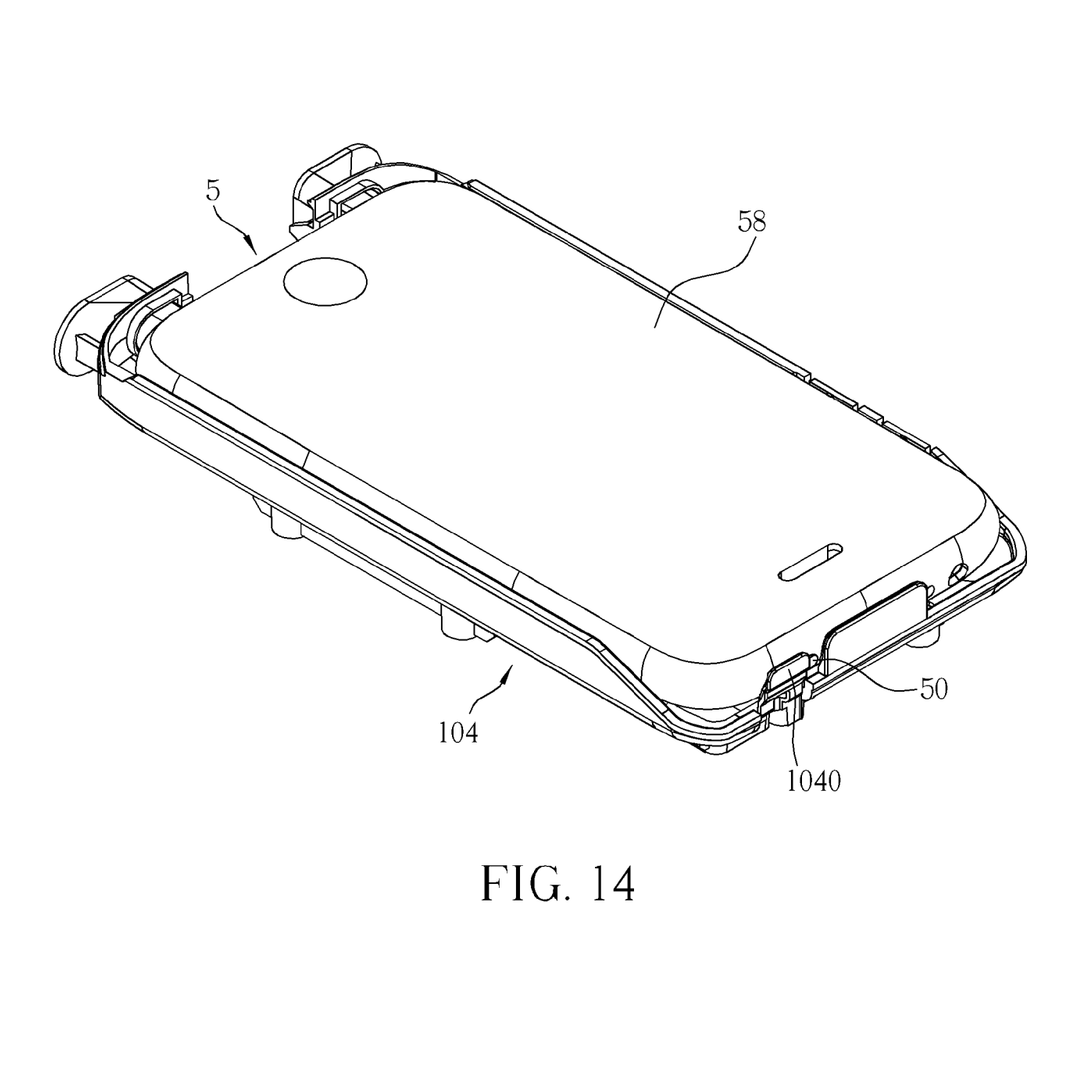
FIG. 14 is a perspective view illustrating the second electronic device disposed on the partition member in FIG. 11 from another view angle.

Referring to FIG. 14, FIG. 14 is a perspective view illustrating the second electronic device 5 disposed on the partition member 104 in FIG. 11 from another view angle. As shown in FIG. 14, the second electronic device 5 may have a power button 50, and the partition member 104 may have a resilient arm 1040 extending from the periphery of the partition member 104 and corresponding to the power button 50 of the second electronic device 5. When the second electronic device 5 is disposed on the partition member 104, the resilient arm 1040 abuts against the power button 50. Furthermore, the upper casing 12 may have a key structure 132 (as shown in FIG. 2) corresponding to the resilient arm 1040 of the partition member 104 (as shown in FIG. 14). In this manner, when the second electronic device 5 is accommodated in the protective casing 1, the user can press the key structure 132 to drive the resilient arm 1040 to trigger the power button 50, so as to power on/off the second electronic device 5.

As shown in FIG. 1, there is at least one hole 128 formed on the upper casing 12 for specific purposes (e.g. light emitting hole, button hole, etc.), and the upper casing 12 may comprise at least one waterproof member (e.g. waterproof film or waterproof glue, not shown) covering the at least one hole 128 respectively, so as to prevent water from entering the protective casing 1 via the at least one hole 128. Furthermore, there is at least one hole 102 formed on the lower casing 10 for specific purposes (e.g. speaker hole, microphone hole, etc.), and the lower casing 10 may also comprise at least one waterproof member (e.g. waterproof film or waterproof glue, not shown) covering the at least one hole 102 respectively, so as to prevent water from entering the protective casing 1 via the at least one hole 102. Moreover, the upper casing 12 may comprise a ring-shaped waterproof member 130 disposed on an inner side of the upper casing 12, as shown in FIG. 3. When the protective casing 1 is in the closed state shown in FIG. 1, the ring-shaped waterproof member 130 can prevent water from entering the protective casing 1 via the junction between the upper casing 12 and the lower casing 10.

Compared to the prior art, no matter which one of the first and second electronic devices is accommodated in the protective casing, a user can press the key structure to drive the first and second resilient arms to trigger the first or second button. Since the protective casing of the invention can be used to accommodate different electronic devices, the protective casing of the invention will save cost for the user.

Those skilled in the art will readily observe that numerous modifications and alterations of the device and method may be made while retaining the teachings of the invention.

What is claimed is:

1. A protective casing adapted for a first electronic device with a first button and a second electronic device with a second button, the protective casing comprising:
a lower casing comprising a partition member disposed therein, the partition member having a first resilient arm extended from a periphery of the partition member; and
an upper casing cooperating with the lower casing to form a first accommodating space therebetween, the first accommodating space being above the partition member;
wherein when the first electronic device is accommodated in the first accommodating space, the first button is at a first distance from a bottom of the partition member; when the second electronic device is accommodated in the first accommodating space, the second button is at a second distance from the bottom of the partition member; and a length of the first resilient arm covers the first and second distances.

2. The protective casing of claim 1, wherein the partition member further has a second resilient arm extended from the periphery of the partition member and adjacent to the first resilient arm, and a length of the second resilient arm also covers the first and second distances.

3. The protective casing of claim 1, wherein the first resilient arm comprises a linear rib formed on an inner surface of the first resilient arm, facing the first or second electronic device when the first or second electronic device is accommodated in the first accommodating space, and used for pressing the first or second button.

4. The protective casing of claim 3, wherein when the first electronic device is accommodated in the first accommodating space, the first button is in contact with the linear rib of the first resilient arm at a first position, when the second electronic device is accommodated in the first accommodating space, the second button is in contact with the linear rib of the first resilient arm at a second position, and the first position is different from the second position.

5. The protective casing of claim 1, wherein the lower casing has a key structure corresponding to the first resilient arm of the partition member.

6. The protective casing of claim 1, wherein the upper casing has a key structure corresponding to a power button of the first or second electronic device.

7. The protective casing of claim 1, wherein a second accommodating space is between the partition member and a bottom of the lower casing.

8. The protective casing of claim 7, further comprising a circuit board and a power supply unit disposed in the second accommodating space, the power supply unit is electrically connected to the circuit board, when the first or second electronic device is accommodated in the first accommodating space, a connector of the first or second electronic device is electrically connected to a connector of the circuit board, such that the power supply unit supplies power to the first or second electronic device.

9. The protective casing of claim 8, further comprising a positioning unit disposed in the second accommodating space and electrically connected to the circuit board.

10. The protective casing of claim 1, further comprising a hinge assembly for pivotally connecting the upper casing to the lower casing.

11. The protective casing of claim 1, wherein the upper casing comprises a transparent sheet which a touch panel of the first or second electronic device abuts against when the first or second electronic device is accommodated in the first accommodating space.

12. The protective casing of claim 1, wherein the upper casing comprises two fastener members pivotally connected to opposite sides of the upper casing, the lower casing comprises two fastener structures formed on opposite sides of the lower casing, and the two fastener members are detachably fastened on the two fastener structures respectively.

13. The protective casing of claim 1, wherein at least one hole is formed on the upper casing, and the upper casing comprises at least one waterproof member covering the at least one hole respectively.

14. The protective casing of claim 1, wherein the upper casing comprises a ring-shaped waterproof member disposed on an inner side of the upper casing.

15. The protective casing of claim 1, wherein at least one hole is formed on the lower casing, and the lower casing comprises at least one waterproof member covering the at least one hole respectively.

* * * * *